United States Patent [19]

Martz et al.

[11] Patent Number: 4,726,062

[45] Date of Patent: Feb. 16, 1988

[54] DUPLEX HANDS-FREE COMMUNICATIONS CIRCUIT

[75] Inventors: Donald Martz, Webster; Robert D. Talbot, Pittsford, both of N.Y.

[73] Assignee: Harris Corporation, Melbourne, Fla.

[21] Appl. No.: 807,596

[22] Filed: Dec. 11, 1985

[51] Int. Cl.⁴ .............................................. H04B 3/20
[52] U.S. Cl. ................................. 379/390; 379/389
[58] Field of Search ............... 179/170.2, 170.6, 170.8, 179/81 B, 81 R, 100 C; 379/388, 389, 390, 406, 407, 409

[56] References Cited

U.S. PATENT DOCUMENTS

| | | | |
|---|---|---|---|
| 2,825,764 | 3/1958 | Edwards et al. | 379/406 |
| 3,462,561 | 8/1969 | Deman | 379/406 |
| 3,591,735 | 7/1971 | Brooks | 379/347 |
| 3,596,011 | 7/1971 | Alexandrovich | 379/406 |
| 3,885,111 | 5/1975 | Ishigami et al. | 379/387 |
| 3,975,588 | 8/1976 | Besseyre et al. | 379/390 |

OTHER PUBLICATIONS

"The New Speakerphone-Executive Model", R. T. Cleary et al., Automatic Electric Technical Journal, Jul. 1961, vol. 7, No. 7, pp. 232-238.

Primary Examiner—Jin F. Ng
Assistant Examiner—R. Vaas
Attorney, Agent, or Firm—L. L. Rogers, III; J. M. Killeen

[57] ABSTRACT

A circuit for reducing the effect of acoustic and electrical feedback in duplex "hands free" telephone sets. The circuit uses relatively simple and inexpensive gain control circuits and expanders to reduce the effects of feedback by controlling the gain of a transmitted signal in inverse relationship to the strength of a the received signal.

11 Claims, 4 Drawing Figures

DUPLEX HANDS-FREE COMMUNICATIONS CIRCUIT

BACKGROUND OF THE INVENTION

The present invention relates generally to circuits which reduce acoustic feedback in communication systems and in particular to a method and apparatus for reducing feedback in "hands free" telephone sets.

"Hands free" telephone sets typically contain a loudspeaker and an area microphone connected through appropriate amplifying circuitry to a transmission path which is communicatively connected to a public telephone network. Such telephone sets allow a conversation in two directions to be carried out without the need to hold a telephone instrument adjacent the user's face and often permit plural users to participate in the conservation with a single telephone set.

In a typical hands free telephone system, a voice signal received from the transmission path is directed through an amplifier to a loudspeaker which transforms the signal from electrical to acoustical energy and permits the signal to be heard at a distance from the loudspeaker. Typically in such systems, a microphone for transforming audio-acoustical signals to electrical signals is placed within the same cabinet as the loudspeaker. The signal received from the microphone is typically amplified by an amplifier and transmitted to the other telephone set participating in the conversation through a transmission path provided by a switched public telephone network.

Because the microphone in many hands free telephone sets is located in proximity to the loudspeaker, the signal received over the loudspeaker is often acoustically coupled back into the microphone and returned along the transmission path to the other telephone set. The user of the other telephone set can often hear the return of the acoustically coupled signal, which sounds similar to an echo, and is distracted and annoyed thereby.

Many telephone systems utilize a single line for the transmission of telephone signals in both directions. In such single line systems, the acoustically cross-coupled signal which is fed back into the microphone at the hands free instrument will couple through the single transmission line or through a hybrid circuit which connects the telephone set to the single line back to the loudspeaker of the hands free instrument. If the amplification of the received and transmitted signals is of a sufficiently high level, the acoustically cross-coupled signal which is subsequently electrically cross-coupled on the transmission path can result in an increasing amplitude signal running around the acoustic and electrical coupling means until the amplifiers of the hands free telephone set are saturated. Such a signal often causes an extremely annoying squeal in the telephone set.

The acoustically cross-coupled signal is also annoying because it may mix and interfere with any signals originating at the hands free telephone instrument. The recipient of such a mixed signal may have considerable difficulty in separating the original signal from the acoustically cross-coupled signal, both of which were received by the same microphone input.

There have been a number of methods and circuits proposed to reduce and/or eliminate acoustic and electrical coupling in hands free telephone sets. In one known method, a hands free telephone set is equipped with an input detection device which operates to disable the transmission sections of the telephone set when a signal is received from the transmission path. Accordingly, when the user of the telephone set hears a communication from the party with which he is speaking, he is unable to respond until the other party ceases speaking.

Similarly, in other known systems, the input detection device is used to control the receiver circuitry, so that when a local input is received through the microphone of the telephone set, the receiver circuitry is disabled. Accordingly, in such systems it is a frequent occurrence that the user of a hands free telephone set is unable to hear signals from the other telephone set while he is speaking.

In both the above methods, the detection device is used simply to disable either the receive or transmit circuitry and thereby to eliminate acoustical and electrical feedback of the transmitted signal. A number of patents such as U.S. Pat. Nos. 3,889,058, 4,052,562, and U.S. Pat. No. Re. 21,835 have been directed to such systems and the means for determining when one amplifying circuit or the other should be disabled.

While the technique of disabling one of the circuits in a telephone set may be effective in eliminating or reducing feedback, such a system is generally disadvantaged by the fact that, at any one time, only one party to the communication can transmit a signal which is received by the other party, i.e., one party cannot interrupt the other party until the other party has finished his communication or if one party begins to communicate, he can no longer hear the other party.

A refinement to systems which simply disconnect one or both of the signal paths are systems such as those disclosed in U.S. Pat. Nos. 2,598,159 and 3,823,273, in which the transmission path is disabled only upon receipt of a signal of predetermined strength on the receive path. While such devices are generally improvements of the simple disabling devices, they are, nonetheless, limited by their disabling of one of the communication paths.

It also known to remove or eliminate echo signals from telephone transmissions by use of digital echo cancellors, sometimes called "adaptive filters". In such systems, disclosed for example in U.S. Pat. Nos. 2,825,764, 3,780,233, and 3,919,654, the signal being transmitted by the telephone set is compared with the signal received from the transmission line within a predetermined period and if the two signals are substantially similar as determined by a digital filter, the received signal is subtracted from the signal to be transmitted prior to amplification and transmission. While echo cancellors reduce the echo/feedback problems in hands free telephone sets, they are generally complex electronic circuits and often require a relatively long period of time for the digital filter to converge and become effective.

Other systems disclosed, for example, in U.S. Pat. No. 3,596,011, employ variable amplification circuitry in the communication receive path of the telephone set. In such known systems, often a measure of the signal level in the transmit path of the telephone set is taken and used to control the gain of the receive path amplifier in an inverse relationship, i.e., when a high volume signal is transmitted by the telephone set, the amplifier circuit in the receive circuitry is adjusted to decrease the amount of amplification applied to signals received at the telephone set. In such systems, however, the gain of the amplifier on the receive circuits in the telephone set depends in large part on an independent signal, the signal to be transmitted, and the receive signal may be unduly suppressed.

It is accordingly an object of the present invention to provide a method and apparatus for reducing acoustic and electrical feedback in hands free telephone circuits.

It is another object of the present invention to provide a novel apparatus and method for effectively reducing feedback signals in telephone systems without the need for complex digital echo cancelling circuitry.

It is still another object of the present invention to provide a novel method and apparatus for reducing feedback signals in amplifier circuits without the need to disable the receive or transmit channels of the amplifier circuit.

It is yet another object of the present invention to provide a novel method and apparatus for reducing acoustic and electrical feedback with a stable control system.

It is still a further object of the present invention to provide a novel method and apparatus to control a feedback reduction circuit in a telephone system in which neither the receive circuit nor the transmission circuit has priority of operation.

It is still another object of the present invention to provide a novel method and apparatus which will suppress acoustic and electrical feedback in a telephone set in which the control circuitry operates over a relatively wide range of signal strengths.

These and other objects and advantages of the present invention will become apparent to one skilled in the art from the claims and from a perusal of the following detailed description when read in conjunction with the attached drawings.

DETAILED DESCRIPTION OF THE PREFERRED EMBODIMENTS

Figure 1:
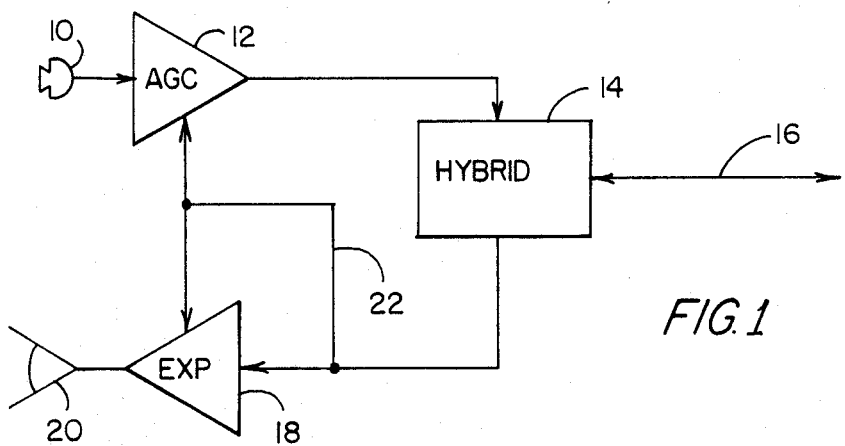
FIG. 1 is a functional block diagram of one embodiment of the duplex hands free telephone circuit of the present invention.

With reference to the drawings, and with particular reference to FIG. 1, the duplex hands free communication circuit of the present invention may include a microphone 10 which feeds a signal to an automatic gain control amplifier ("AGC") 12. The signal output from the AGC 12 may be provided to a conventional hybrid circuit 14 which couples a telephone line 16 to the transmission and receive channels of the hands-free circuit. The telephone line 16 may be connected to any standard telephone network system for the establishment and maintenance of a telephony communication path to a remote telephone subscriber. Signals received from the remote telephone subscriber along the telephone line 16 are directed by the hybrid 14 to an expander circuit 18 which amplifies the received signal and provides the amplified signal to a loudspeaker 20 which converts the received electrical signals into acoustical signals for reception by the person using the hands-free circuit. The signal received from the telephone line 16 by the hybrid 14 is also provided to the control circuitry of the AGC 12 and the expander circuit 18 via a feedback path 22.

In operation, acoustical signals detected by the microphone 10 are converted into electrical signals and are provided to the input terminals of the AGC 12. The AGC 12 amplifies the electrical signal provided at its input terminal in inverse proportion to the strength of the signal appearing on the control path 22. The amplified signal output from the AGC 12 is provided to the hybrid 14 which couples the amplified signal into the telephone line 16 for transmission to the telephone network. While hybrid circuits ideally retransmit the entire signal appearing at their input terminals on the telephone line 16, actual hybrid devices do not wholly retransmit the signal over the telephone line 16 and a fraction of the signal is inadvertently coupled into the receive channel. Accordingly, a portion of the signal applied to the hybrid 14 is coupled into the receive channel and is provided to the expander 18 and subsequently to the loudspeaker 20. If a substantial portion of the input signal at the hybrid 14 is coupled into the receive channel and further amplified by the expander 18, an uncontrolled amplification of the original acoustical signal may occur as the signal loops about the hands-free circuit until one or more of the amplifiers saturates.

To prevent uncontrolled oscillations, a circuit of the present embodiment includes a control path from the receive channel to the control circuitry of the AGC 12 on the transmitter channel. The AGC 12 is configured to amplify the signal appearing at its input terminal in an amount inversely proportional to the signal appearing on the control path 22. If the amount of cross-coupling through the hybrid 14 and the amount of amplification provided by the expander 18 and the AGC 12 is selected properly, a gain around the loop circuit of less than unity can be acheived and the circuit is stable.

The expander 18 may be any conventional expander circuit. The expander circuit operates to increase the amplitude of higher amplitude signals and to lower relatively the amplitude of lower amplitude signals, providing better amplitude variation to signals received at the input terminal of the expander 18.

With continued reference to FIG. 1, a signal which is transmitted by the duplex hands-free circuit from the microphone 10 to the AGC 12 and hybrid 14 is expanded by the expander 18 and converted to acoustical energy by the loudspeaker 20. The appearance of the coupled signal across the hybrid 14 and on the receive channel automatically reduces the gain of the AGC 12 so that the signal which is acoustically cross-coupled from the loudspeaker 20 to the microphone 10 will not oscillate uncontrollably. Similarly, signals received from the telephone line 16 are applied to the hybrid 14 and then to the expander 18. Receipt of the signal on the receive channel automatically reduces the gain of the AGC 12 so that the acoustically coupled signal from the loudspeaker 20 to the microphone 10 is amplified to a lesser degree and unwanted loop oscillations are avoided.

Generally, the signals which are inadvertently coupled by the hybrid 14 from the transmission channel to the receive channel are considerably lower in amplitude than the signals received from the telephone line 16 and applied by the hybrid 14 to the receive channel. Accordingly, the expander 18 can be configured so that such low amplitude signals are suppressed. Additionally, the signal cross-coupled by the hybrid 14 from the transmission channel to the receive channel will not greatly effect the AGC 12 because of the cross-coupled signal's low amplitude. If, however, the cross-coupled signal is of sufficient amplitude to cause oscillation, the use of the inversely proportional gain control amplifier, AGC 12, will ensure that such signal is not amplified to cause unbounded loop oscillations.

Note that in the duplex hands-free circuit illustrated in FIG. 1, the receive channel has preference and controls the circuit. For example, if a user provides an acoustical signal to the microphone 10 and simultaneously a signal is received on the telephone line 16 from the remote telephone set, the received signal will cause a reduction in the gain of the AGC 12, causing the signal transmitted by the hands-free circuit to be of lower amplitude than if no signal had been received.

Figure 2:
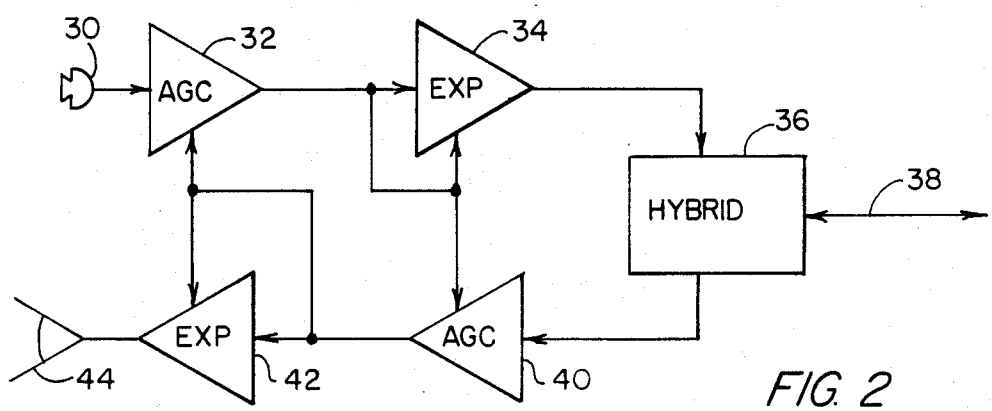
FIG. 2 is a functional block diagram of another embodiment of a duplex hands free telephone circuit of the present invention.

With reference to FIG. 2, a second embodiment of a duplex hands-free circuit of the present invention may include a microphone 30 which provides its output signal to an automatic gain control circuit ("AGC") 32. The output signal from the AGC 32 may be provided to an expander 34 and from the expander 34 to a hybrid 36 which couples the signal received from the expander 34 to a telephone line 38. The telephone line 38 is connected to a telephone network for the establishing and maintaining of a telephone communication between remote users.

With continued reference to FIG. 2, signals received from the telephone line 38 are coupled by the hybrid circuit 36 to a second or receiver automatic level control circuit 40 on the receive channel of the duplex hands-free circuit. The output signal from the second AGC 40 is provided to a second or receiver expander 42 and thence to a loudspeaker 44.

The duplex hands-free circuit of FIG. 2 can be seen to include two of the control circuits of the duplex hands-free circuit of FIG. 1. One of the control circuits, comprising an expander and an AGC, primarily controls the signal emanating from the local microphone 30 and the other control circuit controls the signal received from the telephone line 38.

Acoustical signals detected by the microphone 30 are converted to electrical signals and provided to the input terminals of the first AGC 32, are amplified in inverse proportion to the signal appearing on the receive channel and are provided to the input terminals of the expander 34 for amplication prior to being coupled by the hybrid 36 to the telephone line 38. Similarly, signals received from telephone line 38 are coupled by the hybrid 36 to the input terminals of the second AGC 40 and then on to the second expander 42 to the loudspeaker 44.

In the hands-free duplex hands-free circuit of FIG. 2, neither the receive nor the transmit channel has precedence. Precedence is given to the channel on which a signal first appears. For example, an acoustic signal applied at the microphone 30 will control the receive AGC 40 and reduce its gain so that signals received from telephone line 38 are not amplified as much as they would be were no signal present at the microphone 30. Since the signal output from the received AGC 40 is lower in amplitude than if the microphone 30 were quiescent, a lower signal is supplied to the gain control circuitry of the transmit AGC 32. Under these circumstances, the transmit channel retains control of the circuitry since the gain of the transmit AGC 32 will not be reduced as greatly as the gain of the receive AGC 40.

Figure 3:
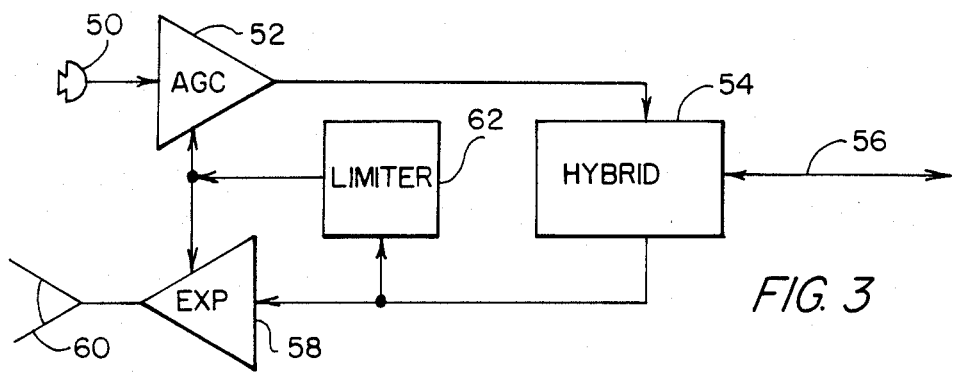
FIG. 3 is a functional block diagram of another embodiment of a duplex hands-free telephone circuit of the present invention.

With reference to FIG. 3, a duplex hands-free circuit of the present invention may include a microphone 50 which detects acoustical signals and converts them to electrical signals which are, in turn, provided to an automatic gain control circuit ("AGC") 52. The signals output from the AGC 52 are provided to a hybrid 54 which couples the signals to a telephone line 56 for transmission within the telephone network. Signals received by the hybrid 54 on the telephone line 56 may be provided to an expander circuit 58 for amplification prior to being provided to a loudspeaker 60 for conversion of the electrical signals into an acoustical signal. Both the AGC 52 and the expander 58 may be controlled by a limiter 62. The input signal to the limiter is provided from the hybrid 54.

In operation the signal which controls the gain of the AGC 52 and the expander 58 is processed through the limiter 62. The clipping level of the limiter 62 removes operation of the expander 58 and attenuation of the AGC 52 if the amplitude of the signal appearing at the input terminals of the limiter is beyond the amplitude range of signals with which the circuit will be used. When the signal exceeds the limiting threshold no further expansion of received signal or attenuation of transmitted signal is provided. This is the desired operating condition, as in this condition, the system is operating linearly and will provide a natural sound.

Figure 4:
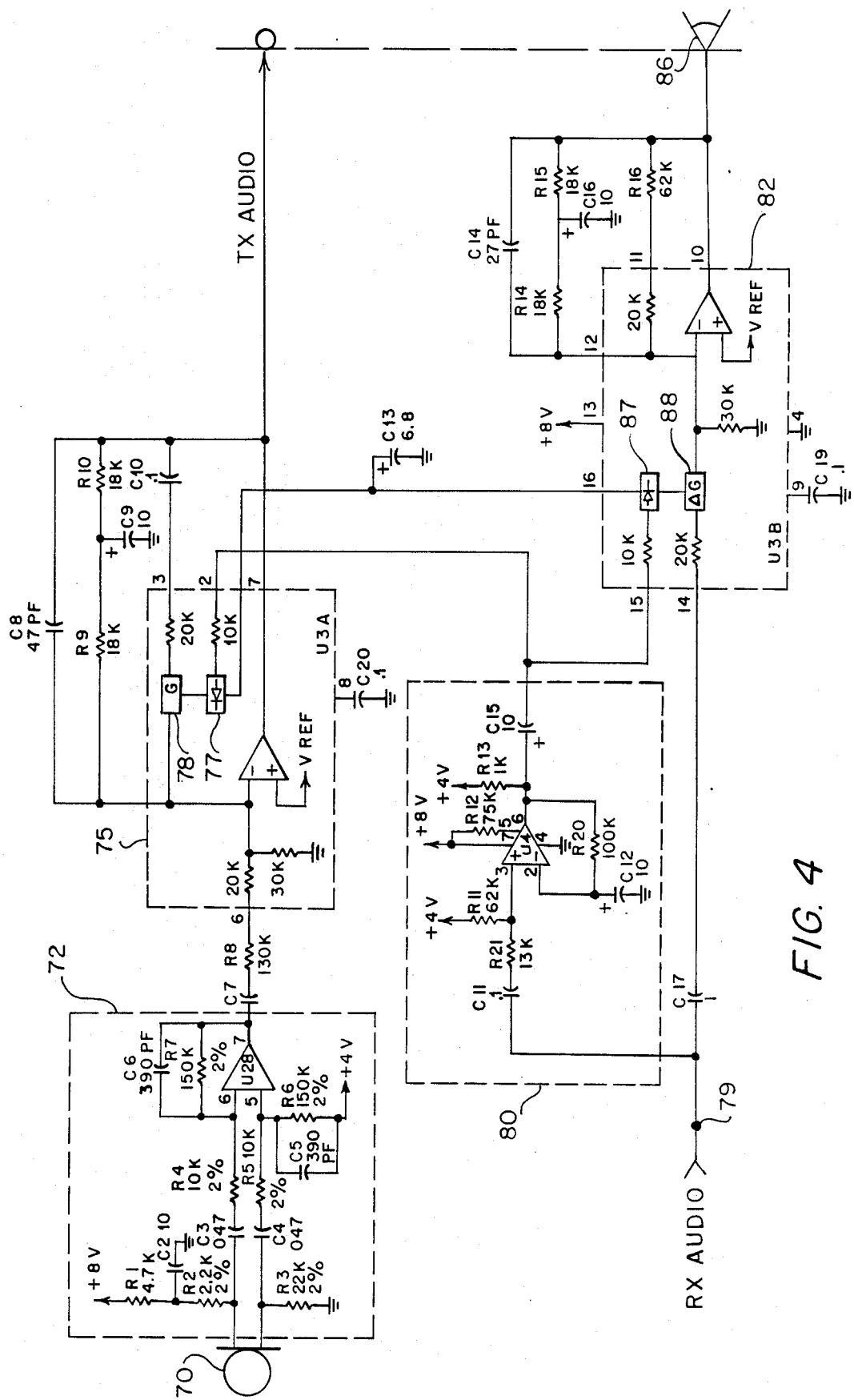
FIG. 4 is a circuit diagram of a circuit utilizing the embodiment of the invention illustrated in FIG. 3.

With reference to FIG. 4, a duplex hands-free circuit of the present invention may include a microphone 70 for detecting acoustical signals. The balanced output signal from the microphone may be applied through a conventional preamplifier circuit 72 to provide an unbalanced signal at the output terminals of circuit 72.

The unbalanced signal may be applied to an automatic gain control circuit ("AGC") 75. The AGC 75 includes a diode rectifier 77 which controls a variable gain cell 78. Feedback resistors R9 and R10, along with feedback capacitor C9, establish a d.c. bias level for the AGC 75. A shunt capacitor C8 establishes the high frequency rolloff characteristic of the AGC 75.

The output signal, TX AUDIO, may be applied to a hybrid circuit or the like for transmission along a public telephone network.

The input signal, RX AUDIO, may be received at an RX input terminal 79 and applied to a limiter or clipper circuit 80 and to an expander 82. The output signal from the limiter circuit 80 may be applied to both the AGC 75 and the expander 80 to control the operation of each circuit. The AGC 75 and expander 80 are also connected to a ground reference through a common tracking capacitor C13. The output signal of the expander 82 may be applied to a loudspeaker 86.

With continued reference to FIG. 4, in operation, a signal received at the RX input terminal 79 is provided to the limiter 80. The limiter 80 is preferably configured so that the range of normal voice signals exceeds the clipping level of the limiter 80. Thus, signals below the range of normal voice signals are permitted to pass through the limiter 80. The output signal from the limiter 80 controls the gain of the AGC 75 and the expander 80 in opposite directions. For example, a relatively weak signal increases the gain of the AGC 75 while decreasing the gain of the expander 80.

To ensure that the AGC 75 and expander 80 are always applying opposite gains, the diode rectifiers 77 and 87 of the AGC 75 and expander 80 are electrically connected through the tracking capacitor C13. The tracking capacitor C13 also controls the attack and decay times of the amplifiers in the AGC 75 and the expander 80.

While the invention has been described with respect to several specific embodiments, it is to be understood that these embodiments are merely exemplary of the invention and that many modifications may be made thereto without departing from the spirit and scope thereof. For example, the limiter used in the circuit shown in FIG. 3 could be incorporated in the circuit of FIG. 2. Accordingly, the invention is not limited by the description of these preferred embodiments, but only by the claims which are appended hereto.

What is claimed is:

1. A hands-free telephone circuit to reduce feedback comprising:
    an audio circuit having transmit audio and receive audio paths, said transmit audio path selectively carrying a transmit signal and said receive audio path selectively carrying a received signal;
    an audio automatic gain control circuit for adjusting the gain in said transmit audio path; and,
    an audio signal expander in said receive audio path;
    whereby the gain of said automatic gain control circuit is controlled by an audio signal appearing on said receive audio path.

2. The circuit of claim 1 wherein the audio signal in said receive audio path controlling said automatic gain control circuit is obtained prior to the expansion of said audio signal by said expander.

3. The circuit of claim 1 wherein the signal controlling the automatic gain control circuit is related to the average amplitude of the received signal.

4. A method for reducing the audio feedback in a hands-free telephone unit having a receive line and a transmit line, said receive line receiving a received audio signal and said transmit line transmitting a transmit audio signal; comprising
    providing an automatic gain control circuit;
    operatively connecting the automatic gain control circuit to control the audio signal transmitted on the transmit line;
    providing an expander circuit;
    operatively connecting the expander circuit to expand the received audio signal appearing on the receive line; and
    controlling the gain of the automatic gain control circuit in relationship to the received audio signal.

5. The method of claim 4 wherein the automatic gain control circuit is controlled in inverse proportion to the amplitude of the received audio signal appearing at the operative connection of the expander circuit.

6. In a subscriber terminal device for communicating signals representing audio information, comprising:
    means for receiving audio signals;
    means operatively connected to said audio signal receiving means for transmitting electrical signals related to said received audio signal;
    means for receiving electrical signals; and
    means operatively connected to said electrical signal receiving means for converting received electrical signals into audio signals,
    a circuit for reducing feedback comprising:
        automatic gain control circuit means to control the amplitude of electrical signals transmitted by said electrical signal transmitting means;
        expander means to expand electrical signals received by said electrical signal receiving means; and
        control means to vary the gain of said automatic gain control circuit means in inverse proportion to the average amplitude of the received electrical signals.

7. The apparatus of claim 6 wherein the product of the gain of the automatic gain control circuit means and the gain of the expander means is less than one.

8. A system of reducing audio feedback in a telephone instrument having a received audio signal and a transmitted audio signal comprising:
    a first automatic gain control circuit for controlling the amplitude of a received audio signal;
    a second automatic gain control circuit for controlling the amplitude of a transmitted audio signal;
    an expander circuit for expanding the controlled received audio signal;
    an expander circuit for expanding the controlled transmitted audio signal; and
    control means to control the gain applied to the received audio signal by said first automatic gain control circuit relative to the amplitude of the audio signal appearing at the expander circuit for the transmitted audio signal, and
    control means to control the gain applied to the transmitted audio signal by said second automatic gain control circuit relative to the amplitude of the audio signal appearing at the expander circuit for the received audio signal.

9. In a hands-free telephone unit having a receive audio path and a transmit audio path, a circuit for reducing the feedback within said system comprising:
    an expander for expanding a signal received on said receive audio path; and
    an automatic gain control circuit for controlling the gain of a signal transmitted on said transmit path in inverse proportion to the amplitude of the signal received on said audio path.

10. In a method for reducing feedback in a hands-free telephone unit comprising expanding a received audio signal in a receiver path and
    controlling automatically the amplitude level of a transmitted audio signal in a transmit path;
    the improvement wherein said amplitude level is controlled in inverse relationship to the amplitude of the received audio signal.

11. A circuit for use in a hands-free telephone unit having transmit and receive communication paths comprising:
    first amplifier means operatively connected to said transmit communication path;
    automatic gain control means operatively connected to said first amplifier means for selectively varying the gain of said first amplifier means in response to a gain control signal;
    second amplifier means having input terminals and operatively connected to said receive communication path for non-linearly amplifying an audio signal appearing at said input terminals; and,
    gain control means for providing said gain control signal responsively to the audio signal appearing on said receive communication path.

* * * * *

UNITED STATES PATENT AND TRADEMARK OFFICE
CERTIFICATE OF CORRECTION

PATENT NO. : 4,726,062
DATED : Feb. 16, 1988
INVENTOR(S) : Donald Martz, Robert D. Talbot It is certified that error appears in the above—identified patent and that said Letters Patent is hereby corrected as shown below:

CLAIM 10

Column 8, line 45

Change "receiver" to "receive"

Signed and Sealed this

Fifteenth Day of November, 1988

Attest:

DONALD J. QUIGG

*Attesting Officer*  *Commissioner of Patents and Trademarks*